United States Patent
Park

(10) Patent No.: US 7,099,106 B2
(45) Date of Patent: Aug. 29, 2006

(54) DECELERATION OF HEAD IN DISC DRIVE ACCORDING TO A DESIRED DECELERATION PROFILE

(75) Inventor: Seung-Chul Park, Suwon-Si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/947,116

(22) Filed: Sep. 22, 2004

(65) Prior Publication Data

US 2005/0073772 A1    Apr. 7, 2005

(30) Foreign Application Priority Data

Sep. 24, 2003  (KR) .................. 10-2003-0066337

(51) Int. Cl.
*G11B 5/596* (2006.01)
(52) U.S. Cl. ............................................. 360/75
(58) Field of Classification Search .................. None
See application file for complete search history.

(56) References Cited

U.S. PATENT DOCUMENTS

| | | | | |
|---|---|---|---|---|
| 5,343,131 A | * | 8/1994 | Baumann | .................. 318/561 |
| 5,485,323 A | * | 1/1996 | Anderson et al. | ........ 360/78.08 |
| 6,163,430 A | * | 12/2000 | Hansen | .................... 360/78.06 |
| 6,229,663 B1 | * | 5/2001 | Yoneda et al. | ................. 360/75 |
| 6,496,319 B1 | * | 12/2002 | Kusumoto et al. | ............ 360/75 |
| 6,721,119 B1 | * | 4/2004 | Hassan et al. | ................ 360/75 |
| 6,937,431 B1 | * | 8/2005 | Galloway | ................ 360/78.06 |

OTHER PUBLICATIONS

Korean Patent Application No. 10-1997-0033492 to Kim, having Publication date of Jul. 12, 2000 (w/ English Abstract page).

* cited by examiner

*Primary Examiner*—K. Wong
(74) *Attorney, Agent, or Firm*—Monica H. Choi

(57) ABSTRACT

A head of a disc drive is decelerated after being accelerated, according to a desired deceleration profile for minimizing damage to the head. The desired deceleration profile is determined from an acceleration profile used for accelerating the head before decelerating the head. With such a desired deceleration profile the head is parked with substantially zero speed by an end of the desired deceleration profile to minimize damage to the head.

23 Claims, 8 Drawing Sheets

DECELERATION OF HEAD IN DISC DRIVE ACCORDING TO A DESIRED DECELERATION PROFILE

BACKGROUND OF THE INVENTION

This application claims priority to Korean Patent Application No. 2003-0066337 filed on Sep. 24, 2003 in the Korean Intellectual Property Office, the disclosure of which is incorporated herein in its entirety by reference.

1. Field of the Invention

The present invention relates generally to disc drives, such as a HDD (hard disc drive) for example, and more particularly, to decelerating a head, after being accelerated in a disk drive, according to a desired deceleration profile for minimizing damage to the head.

2. Description of the Related Art

A (HDD) hard disc drive magnetically records data on or reproduces data from a rotating magnetic disc. The HDD is capable of accessing a large amount of data at high speed and thus has been frequently used as an auxiliary storage device of a computer system.

A latch system of a hard disc drive protects a disc and a head from external impact when the head is not floating over the disc. In general, such a latch system is classified into a magnetic type, an electromagnetic type, and a lamp loading type.

The magnetic type latch system is easy to operate, and thus, its use is popular. This system fixes a head in a parking zone using magnetic force when the head is not floating over a data area of a disc. An actuator within the HDD has the head mounted thereon, and the actuator is moved when current is applied to a voice coil motor (VCM). The actuator is thus moved for accelerating the head to a position over the disc after being unlatched.

If servo information is not read from a disc during such unlatching of the head, the unlatching process is stopped and the head is returned to the parking zone. However, since the head is moving over the data area at a very high speed after unlatching, large currents must be applied to the VCM so as to return the head to the parking zone away from the data area. Such high currents cause a high speed of the head during parking which may cause the head to be physically damaged.

Thus, the actuator and the head mounted thereon are desired to be decelerated for parking the head with minimized damage to the head.

SUMMARY OF THE INVENTION

Accordingly, the head is decelerated after being accelerated in a disc drive, according to a desired deceleration profile for minimizing damage to the head. The desired deceleration profile is determined from an acceleration profile used for accelerating the head before decelerating the head. A deceleration current is applied to a voice coil motor (VCM) according to the desired deceleration profile to decelerate the head.

In another embodiment of the present invention, the deceleration current is applied to the VCM according to the desired deceleration profile when servo information is determined to be not available after the head is accelerated.

In a further embodiment of the present invention, a flag is set indicating that the head is being decelerated to be re-latched.

In one embodiment of the present invention, the desired deceleration profile is a graph of a magnitude of the deceleration current versus time, and the acceleration profile is a graph of a magnitude of an acceleration current applied on the VCM versus time.

In addition, the desired deceleration profile is determined from having an integration value of the desired deceleration profile substantially equal to an integration value of the acceleration profile. In that case, the head is parked with substantially zero speed by an end of the desired deceleration profile.

In an example embodiment of the present invention, the acceleration profile includes a maximum acceleration current ($I_a$) being applied to the VCM for an acceleration time period ($T_a$). In addition, the desired deceleration profile includes a maximum deceleration current ($I_b$) being applied to the VCM for a first deceleration time period ($T_{b1}$), and includes a ramping down of the deceleration current from ($I_b$) to zero during a second deceleration time period ($T_{b2}$). In that case, $T_{b2}=2*[T_a-T_{b1}]$, when $I_a=I_b$.

The present invention may be applied to particular advantage when the disc drive is a HDD (hard disc drive). However, the present invention may be practiced for any other types of disc drives having a head that is accelerated and decelerated.

BRIEF DESCRIPTION OF THE DRAWINGS

The above and other aspects and advantages of the present invention will become more apparent when described in detailed embodiments thereof with reference to the attached drawings in which.

The figures referred to herein are drawn for clarity of illustration and are not necessarily drawn to scale. Elements having the same reference number in FIGS. 1, 2, 3, 4, 5, 6, 7, 8, 9, 10, and 11 refer to elements having similar structure and/or function.

DETAILED DESCRIPTION OF THE INVENTION

The present invention is described herein for a HDD (hard disc drive). However, the present invention may be practiced for any other types of disc drives having a head that is accelerated and decelerated.

A hard disc drive (HDD) is generally divided into two parts: a printed circuit board assembly (PCBA) in which various circuit parts are mounted on a printed circuit board (PCB), and a head disc assembly (HDA) in which machine parts including a head and a magnetic disc and circuit parts are installed.

Figure 1:
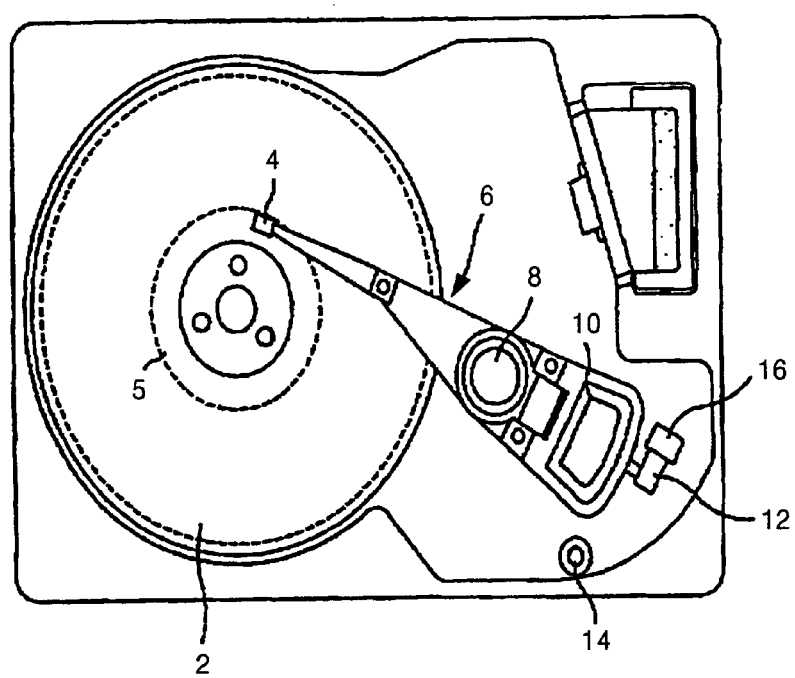
FIG. 1 is a schematic view of a head disc assembly (HDA)

FIG. 1 is a schematic view of a HDA. Referring to FIG. 1, data input from a computer (not shown) is recorded as a magnetic signal on a disc 2. The disc 2 is rotated at a constant speed by a spindle motor (not shown). A head 4, which is mounted on a front end of an actuator 6 floats at a predetermined height over the disc 2 and performs write/read operation on the disc 2 as the disc 2 is rotating at a constant speed. The other end of the actuator 6 is attached with a piece of iron 12 attracted toward a magnet 16. The actuator 6 is supported by a pivot bearing 8, and the actuator is rotatably coupled to the pivot bearing 8.

A voice coil motor (VCM) 10 is positioned between the pivot bearing 8 and the piece of iron 12 of the actuator 6. When the VCM 10 is driven with a current applied thereon, the actuator 6 rotates with respect to the pivot bearing 8, thus moving the head 4 with respect to the disc 2 in a radial direction.

Further referring to FIG. 1, an outer crash stopper 14 is installed on a base of the HDA of FIG. 1 to prevent the head 4 from deviating too much from the disc 2. When a HDD is not in use, the magnet 16, which is also referred to as an inner crash stopper, contacts the piece of iron 12 attached to the other end of the actuator 6, thus fixing (i.e., latching) the actuator 6 and thus the head 4. Referring to FIG. 1, when the actuator 6 is latched to the magnet 16, the head 4 is parked in a parking zone 5.

Figure 2:
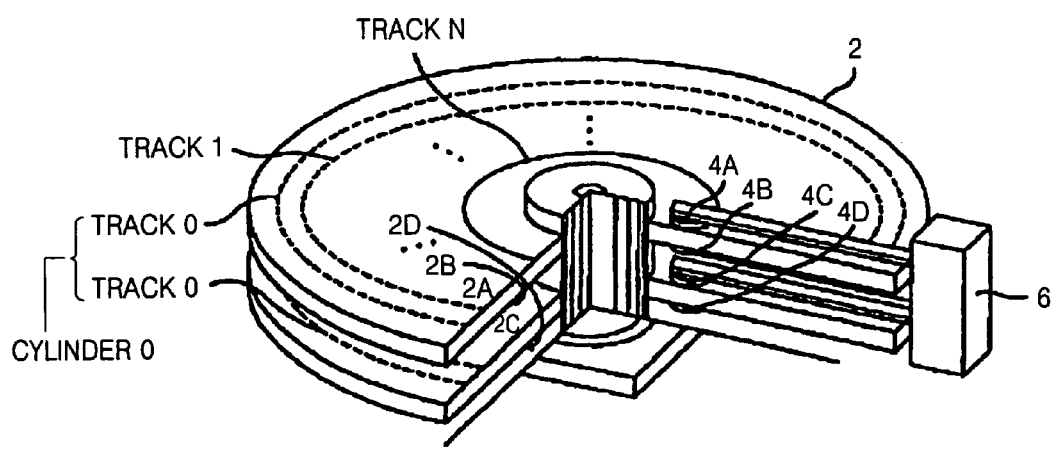
FIG. 2 is a partially cut cross-sectional view of discs loaded into a multiplatter hard disc drive (HDD)

FIG. 2 is a partially cut cross-sectional view of discs 2 within a multiplatter HDD that maximizes data storage capacity. Referring to FIG. 2, two sheets of discs 2 are fixed to a driving axis of the spindle motor (not shown). The two sheets of discs 2 in total have four surfaces 2A, 2B, 2C, and 2D with corresponding four heads 4A, 4B, 4C, and 4D. A plurality of tracks is formed on each of the surfaces 2A, 2B, 2C, and 2D in concentric circles along a radial direction. The respective tracks for each of the surfaces 2A, 2B, 2C, and 2D are given track numbers 0 through N. Tracks with the same track number through each of the four surfaces 2A, 2B, 2C, and 2D are referred to as a cylinder. That is, tracks with the same track number through the four surfaces 2A, 2B, 2C, and 2D have the same cylinder number. For instance, the four tracks with track number 0 for the four surfaces 2A, 2B, 2C, and 2D are assigned cylinder number 0.

Within a HDD, a head is positioned to a desired track using a servomechanism. Positioning the head to the desired track uses two servo control modes: a track seek mode and a track following mode. In the track seek mode, the head is moved from a current track to a desired track. In the track following mode, after the head is positioned on a track, the position of the head is maintained along a centerline of the track for accurate read/write operations.

Figure 3:
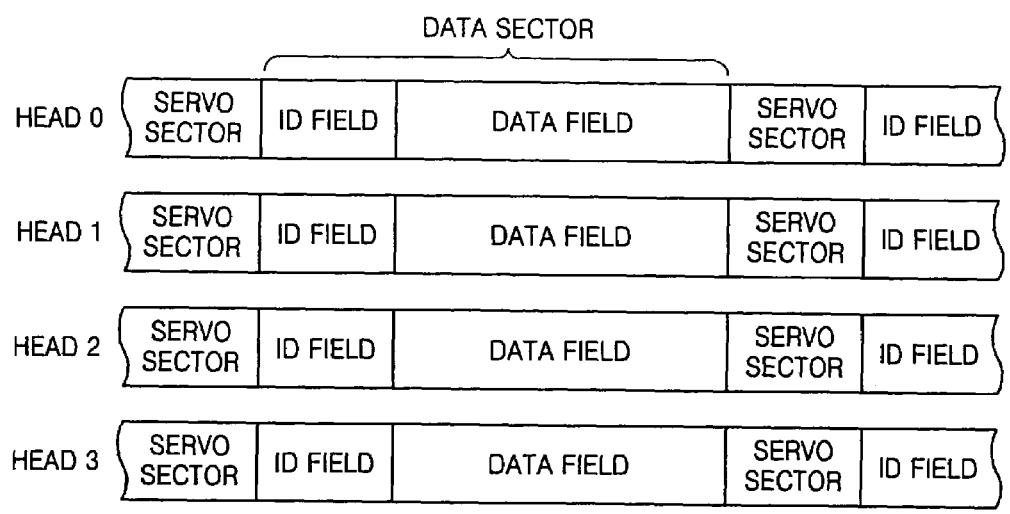
FIG. 3 illustrates data formats of tracks of discs loaded into a HDD.

For track seeking, track following, and read/write operations, each of the disc tracks typically has a data format as illustrated in FIG. 3. FIG. 3 illustrates data formats (or sector formats) of four tracks for a cylinder through the four surfaces 2A, 2B, 2C, and 2D corresponding to the four heads 4A, 4B, 4C, and 4D in the example embodiment of FIG. 2.

Referring to FIG. 3, a servo sector and a data sector are alternately formed on each of the disc tracks corresponding to heads #0, #1, #2, and #3 (i.e., for the four heads 4A, 4B, 4C, and 4D in the example embodiment of FIG. 2). A servo control operation, such as a track seeking operation or a track following operation, is performed using the servo sector, and user data is recorded on the data sector. In general, the servo sectors occupy about from 9 to 11% of a storage capacity of a disc.

In general, as shown in FIG. 3, a data sector is divided into an identification (ID) field and a data field. The ID field stores header information that indicates identification of the data sector, and the data field stores digital data. Servo sectors are positioned before and after a data sector.

Figure 4:
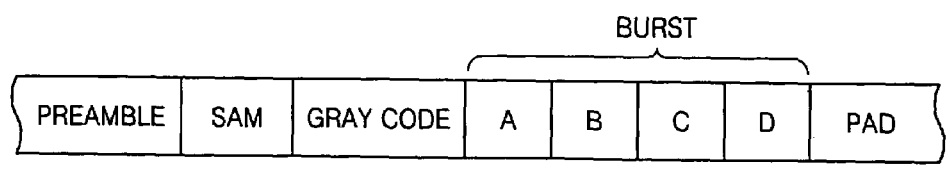
FIG. 4 illustrates a detailed structure of a servo sector of FIG. 3.

FIG. 4 illustrates a detailed structure of the servo sector of FIG. 3. The servo sector of FIG. 4 includes a preamble, a servo address mark (SAM), a gray code, bursts A, B, C, and D, and a pad.

The preamble, which is also referred to as servo sync, indicates presence of the servo sector, and also enables clock synchronization during reading of servo information. The SAM indicates initiation of servo information and provides synchronization for reading the gray code that follows the SAM. That is, the SAM acts as a reference point for generation of timing pulses related to servo control. The gray code provides information regarding the track (i.e., track information). The bursts A, B, C, and D provide a position error signal (PES) required for the track seeking/following operation. The pad provides a transition margin between the servo sector and the data sector.

Figure 5:
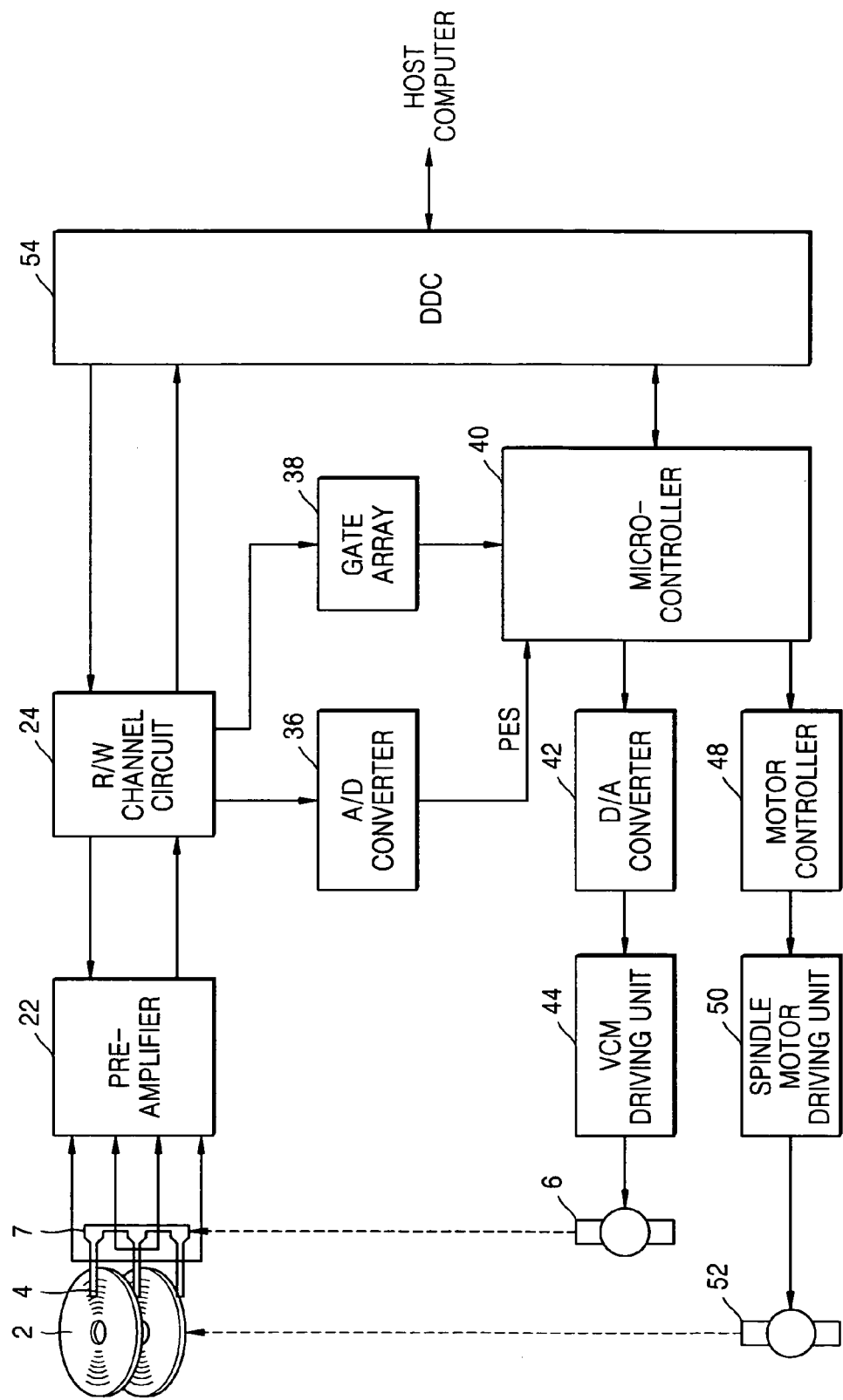
FIG. 5 is a block diagram of a HDD, according to an embodiment of the present invention.

FIG. 5 is a block diagram of a HDD (hard disk drive) having the two sheets of discs 2, according to an embodiment of the present invention. Referring to FIG. 5, discs 2 are rotated by a spindle motor 52. The heads 4 are located over the discs 2 and are mounted on a front end of arms extending from an arm assembly 7 of an actuator 6. A preamplifier 22 amplifies a signal detected by any of the heads 4 during a read operation. In addition, the preamplifier 22 drives the heads 4 to record encoded write data, which is input from a read/write (R/W) channel circuit 24, on the disc 2 during a write operation.

The R/W channel circuit 24 detects data pulses from a read signal input from the preamplifier 22, decodes the data pulses, and outputs the result of such decoding to a disc data controller (DDC) 54. Also, the R/W channel circuit 24 encodes write data input from the DDC 54 and provides a result of such encoding to the preamplifier 22. The DDC 54 receives data input from a host computer, and sequentially sends such data to the R/W channel circuit 24 which controls the preamplifier 22 to record such data on the disc 2.

Furthermore, the DDC 54 interfaces communication between the host computer and a microcontroller 40. The microcontroller 40 controls the track seeking or track following operation in response to a read/write command input from the host computer. A VCM driving unit 44 receives a servo control value, which is used for servo control (or head position control) by the microcontroller 40, from a digital-to-analog (D/A) converter 42. The VCM driving unit 44 generates a driving current for driving the actuator 6, and applies the driving current to a VCM of the actuator 6. The actuator 6 moves the heads 4 over the discs 2 in a radial direction depending on the direction and level of the driving current applied from the VCM driving unit 44.

A motor controller 48 applies a control value for controlling rotation of the discs 2 to a spindle motor driving unit 50 under control of the microcontroller 40. The spindle motor driving unit 50 drives the spindle motor 52 based on the control value to rotate the discs 2.

An analog-to-digital (A/D) converter 36 converts a PES into a digital signal and outputs the digital signal to the microcontroller 40. The PES is based on burst signals and is included in the servo information input from the R/W channel circuit 24. A gate array 38 generates various timing signals required to perform read/write operations, decodes the servo information, and applies a result of decoding to the microcontroller 40.

When the HDD of FIG. 5 is not in use, each of the heads 4 is parked in a respective parking zone (such as the parking zone 5 of FIG. 1 for example). Then, the piece of iron 12 at an opposite end of the actuator 6 is attracted to and latched to the magnet 16 as described above with reference to FIG. 1. Thus, when the piece of iron 12 is latched to the magnet 16 at one end of the actuator 6, the corresponding head 4 at the other end of the actuator 6 is also "latched" by being parked in the parking zone 5. In this case, the piece of iron 12 and the magnet 16 act as latches in a latching system of the magnetic type.

When the HDD operates for a read/write, the microcontroller 40 controls the heads 4 parked in the parking zone 5 to move to be over a data area of the discs 2. For such movement of the heads 4, the actuator 6 and thus the heads 4 are first unlatched.

Figure 6:
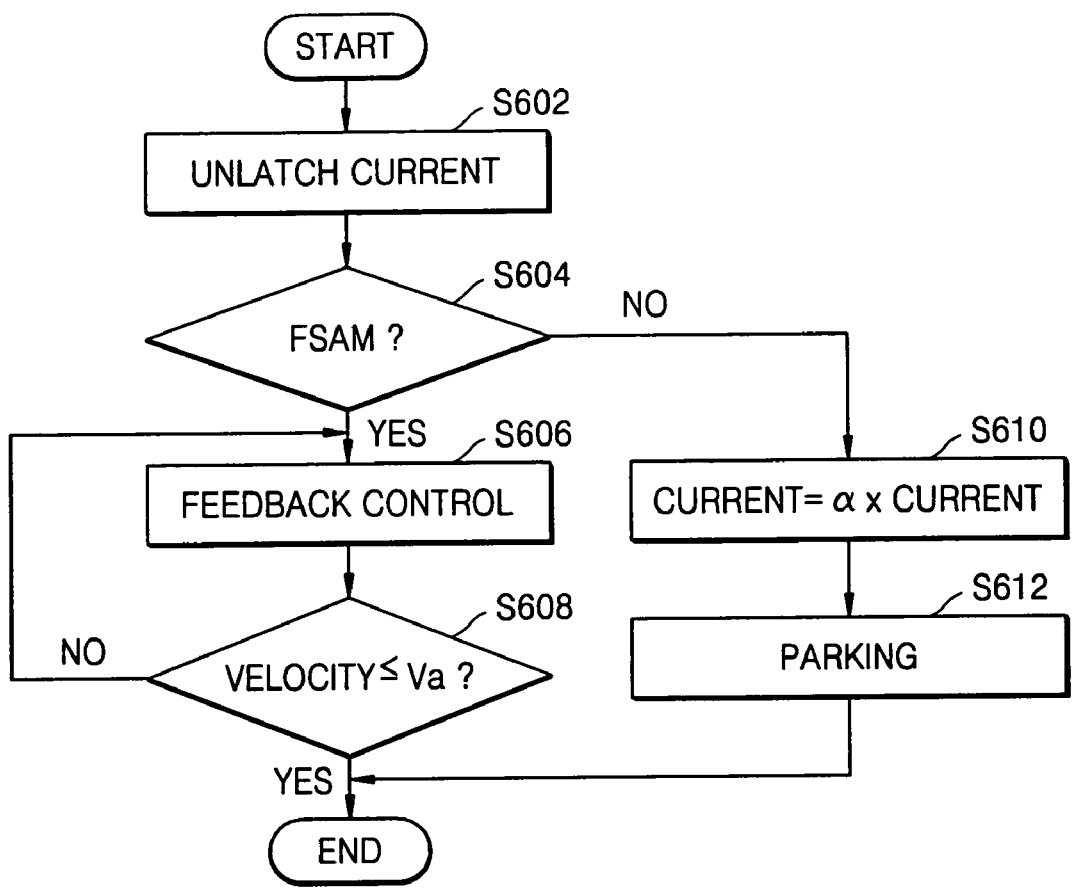
FIG. 6 is a flowchart illustrating a conventional method of unlatching a head in a HDD.

FIG. 6 is a flowchart illustrating a conventional method of unlatching the actuator 6 and thus the heads 4 in the HDD of FIG. 5. The prior art and the present invention are described for accelerating and decelerating an example head 4 with respect to an example disc 2, as illustrated in FIG. 1. However, the present invention may be practiced for accelerating and decelerating any number of the heads 4 with respect to corresponding discs 2 of the multiplatter HDD, as illustrated in FIG. 2.

When the HDD operates, the microcontroller 40 controls the spindle motor 52 to rotate the disc 2 at a constant speed. After the disc 2 is rotated at the constant speed, an acceleration current (which may be comprised of a plurality of current pulses) is applied to the VCM of the actuator 6 via the VCM driving unit 44. The VCM having such current applied thereon applies force on the actuator 6 such that the actuator overcomes a latching force (i.e., the magnetic force) of the magnet 16 to become separated from the magnet 16. Such a process is referred to an unlatching process.

More specifically, referring to FIG. 6, the acceleration current is applied to the VCM of the actuator 6 for a predetermined time (i.e., an acceleration period). With such current, the actuator 6 and thus the head 4 overcome the latching force of the magnet 16 and move to be over the data area of the disc 2 (step 602).

After the acceleration period, any servo information read by the head 4 is input to the R/W channel circuit 24 so as to determine whether a servo address mark is not found (i.e., whether a fault servo address mark (FSAM) is generated) (step 604). If such servo information is available, a head moving speed is adjusted to be equal to or smaller than a reference head moving speed $V_a$, using a speed feedback controller (not shown) (steps 606 and 608).

The head moving speed is determined from such available servo information (such as head moving speed=(current sampled track number−previous sampled track number)/sampling period, for example). The sampled track numbers are determined from the gray code.

On the other hand, if the servo information is determined to be not available in step 604 (for example, when the servo address mark is not detected), the acceleration current applied to the VCM of the actuator 6 is periodically reduced to predetermined ratios and applied for a predetermined time (during a deceleration period) (step 610). In other words, when the servo address mark is not detected, the deceleration current is applied to the VCM according to a set deceleration pattern regardless of the latching force in the prior art. Next, the head 4 is parked into the parking zone 5 of FIG. 1 (step 612), and the method of FIG. 6 ends.

Figure 7:
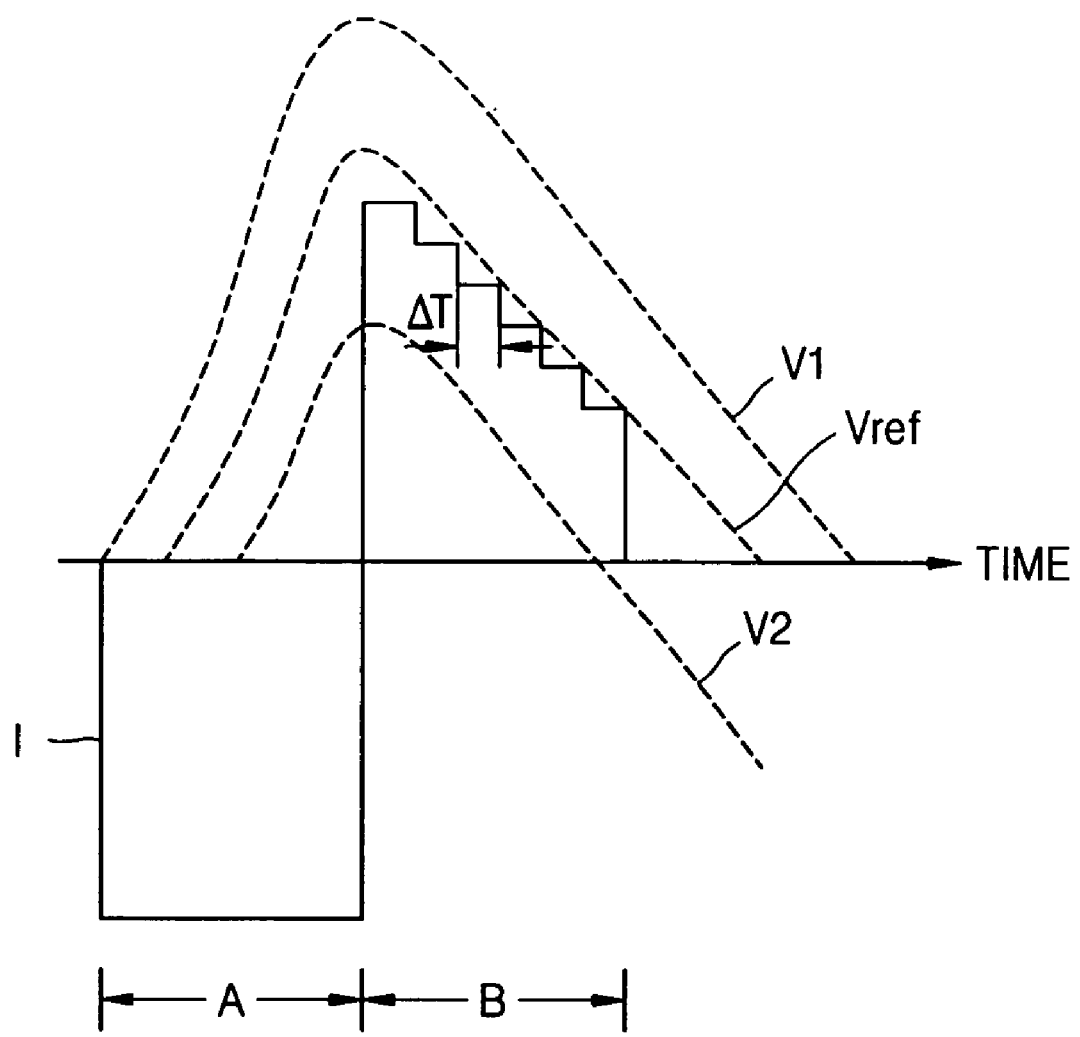
FIG. 7 is a graph illustrating the relationship between electric currents applied to a voice coil motor (VCM) and a head moving speed according to the conventional method of FIG. 6.

FIG. 7 is a graph illustrating the relationship between current applied to the VCM of the actuator 6 and the head moving speed, according to the conventional method of FIG. 6. The graph of FIG. 7 plots head moving speed versus time. Referring to FIG. 7, early in an unlatching process, acceleration current is applied to the VCM during an acceleration period A so that the actuator 6 may overcome a magnetic force of the magnet 16 for moving the head 4 out of the parking zone 5 and over a data area of the disc 2. During a deceleration period B, deceleration current is applied to the VCM in the opposite direction of the acceleration current. Note that each of the acceleration current and the deceleration current may be comprised of a plurality of current pulses applied on the VCM.

In addition, the magnitude of the applied deceleration current is reduced step by step (with each such step denoted over a period of ΔT in FIG. 7). For instance, assume that the magnitude of acceleration current applied on the VCM of the actuator 6 during the acceleration period A is I. In that case, during the deceleration period B, the magnitude of the applied deceleration current decreases by α*I for each step of the time period ΔT, with α<1.

The deceleration period B is just set to a fixed value in the conventional method of FIGS. 6 and 7. Thus, in the conventional method of FIGS. 6 and 7, it is impossible to precisely estimate a head moving speed at the end of the deceleration period B. The magnetic force of magnets used in latching systems of various HDDs may differ from one another, and the magnetic force of a magnet may change with time or ambient conditions.

Accordingly, as shown in FIG. 7, three different head moving speeds V1, Vref, and V2 may result. Vref denotes a head moving speed resulting when the head is accelerated within a predetermined range. V1 denotes a head moving speed resulting when acceleration of the head does not reach the predetermined range. V2 denotes a head moving speed resulting when acceleration of the head exceeds the predetermined range.

If a head moving speed is fast enough at the end of the deceleration period B (such as V1 for example), the head 4 is parked in the parking zone 5 with such high moving speed that the actuator 6 bumps against the outer crash stopper 14. The head 4 that is parked in this manner with such high moving speed may be disadvantageously damaged.

Figure 8:
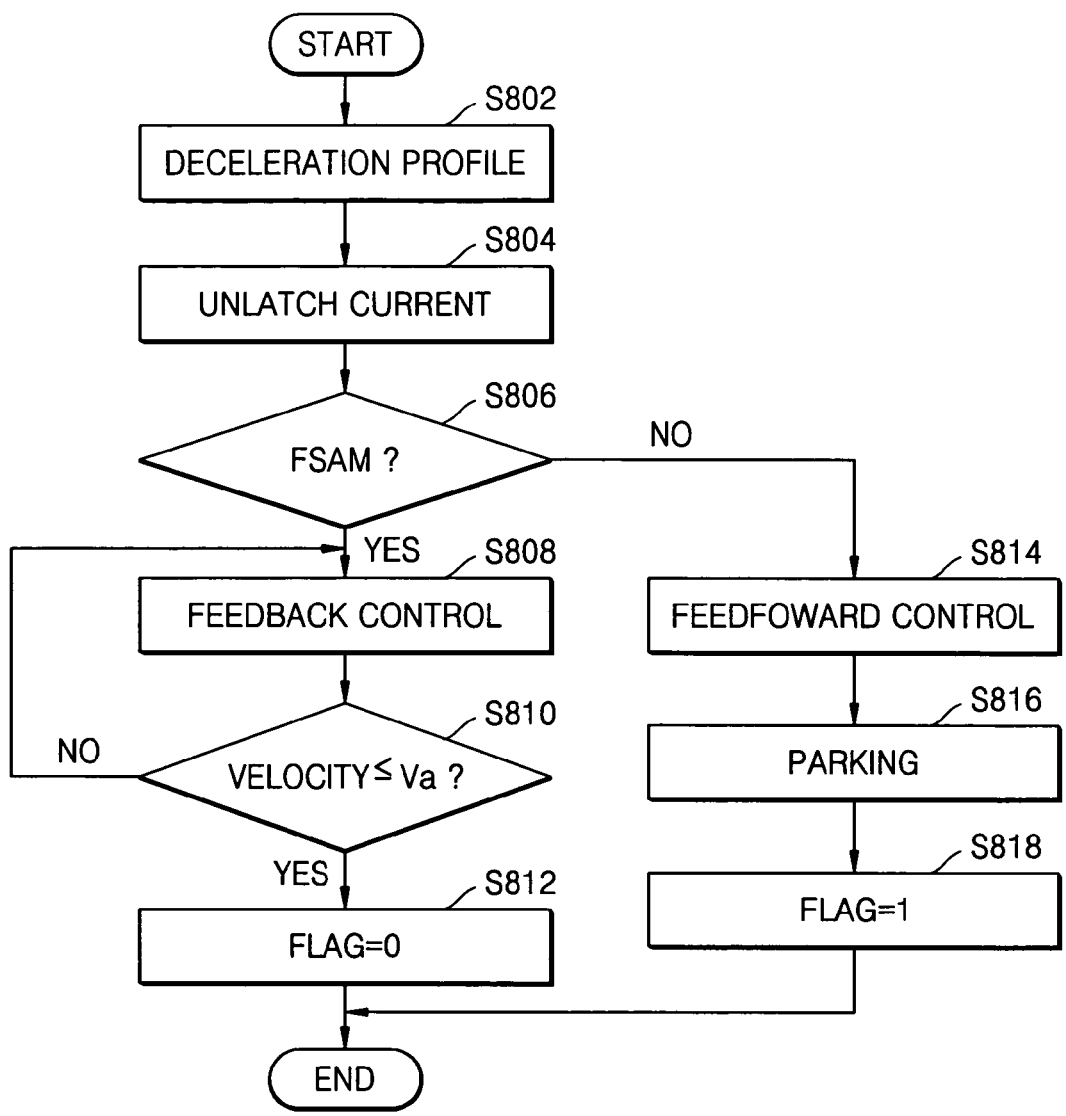
FIG. 8 is a flowchart illustrating a method of unlatching a head in a HDD, according to an embodiment of the present invention.

To prevent such damage to the head 4, the present invention reduces the head moving speed to substantially 0 for parking of the head 4, by determining a desired deceleration profile for the deceleration current applied to the VCM of the actuator 6. FIG. 8 is a flowchart illustrating a method of unlatching the head 4, according to an embodiment of the present invention. In the method of FIG. 8, a desired deceleration profile is determined (step 802).

Figure 9:
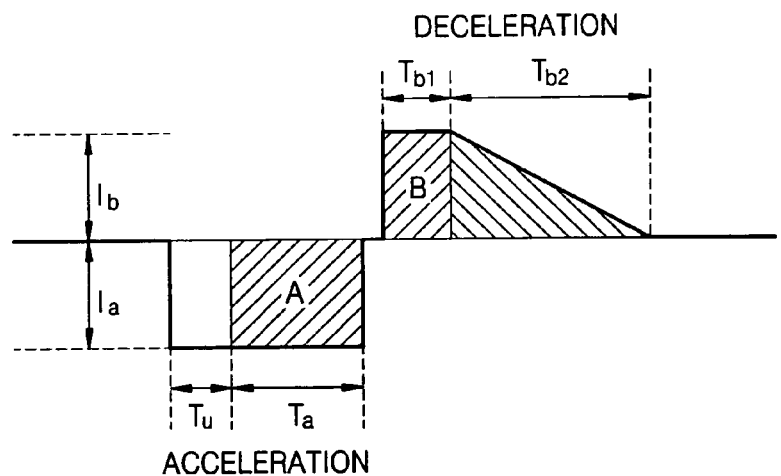
FIG. 9 illustrates a desired deceleration profile used in performing a method of unlatching a head in a HDD, according to an embodiment of the present invention.

In detail, the desired deceleration profile is determined from two time components $T_u$ and $T_a$ (as illustrated in FIG. 9) comprising a total acceleration time $T_{total}$. $T_u$ is the time period required for the actuator 6 to overcome the latching force of the magnet 16 to be separated from the magnet 16. $T_a$ is the time period required to move the head 4 to a predetermined section of a data area of the disc 2 starting from separation of the actuator 6 from the magnet 16. $T_u$ is measured by a process test, and methods of measuring $T_u$ and determining the desired deceleration profile will be described later in greater detail.

After step 802, acceleration current (which may be comprised of a series of current pulses) having a maximum level of current $I_a$ is applied to the VCM of the actuator 6 for a total acceleration time period $T_{total}=T_u+T_a$ (as illustrated in FIG. 9). During such total acceleration time period $T_{total}$ in FIG. 9, the actuator 6 overcomes the magnetic force (i.e., a latching force) of a latch system (i.e., the magnet 16), and the head 4 is moved to the data area (step 804). If the time $T_u$ is too short, the actuator 6 fails to overcome the latching force. In addition, the time $T_a$ is determined to be long enough for the head 4 to move to a middle part of the data area of the disc 2. The times $T_u$ and $T_a$ can be precisely determined using a process test, as later described herein.

As the head 4 is moved over the data area of the disc 2, it is determined whether servo information is available (such as by determining whether a servo address mark is detected) (step 806). When the servo address mark is detected, servo information is determined to be available, and a head moving speed is calculated using the gray code. In that case, a head moving speed is adjusted based on the calculated head moving speed using a feedback controller (step 808).

When the calculated head moving speed is less than or equal to a reference head moving speed Va (step 810), the method of FIG. 8 ends after setting a FLAG signal to 0 (step 812). In the case that the servo address mark is detected, the actuator 6 and thus the head 4 are deemed to be successfully unlatched to be over the data area of the disc 2. Thus, in that case, it is not required to perform the re-latching and unlatching process again as indicated by FLAG=0 (step 812).

On the other hand, if the servo address mark is not detected (at step 806), servo information is determined to be unavailable, and the head moving speed is reduced according to the desired deceleration profile obtained in step 802 (step 814). Subsequently, the head 4 is parked in the parking zone 5 (step 816). In this case, since the head 4 is parked in the parking zone 5, the unlatching process needs to be reinitiated as indicated by the FLAG signal being set to 1 (step 818).

FIG. 9 illustrates an example desired deceleration profile determined from an example acceleration profile, according to an embodiment of the present invention. The desired deceleration profile is determined from attaining a head moving speed to be substantially 0 at the end of the deceleration profile. Such a deceleration profile is determined by setting an integration value of a magnitude of the acceleration profile to be equal to an integration value of the magnitude of the desired deceleration profile.

$T_a$ is first calculated for determining the desired deceleration profile. Conventionally, $T_a$ is timed from start to end of applying the acceleration current to the VCM. However, the unlatching time period of $T_u$ is required from the start of applying such acceleration current to separate the actuator 6 from the latch system. Thus, $T_u$ is not related to acceleration of movement of the actuator 6 and the head 4, and must be excluded from the time $T_a$.

Given the maximum level of acceleration current ($I_a$), the maximum level of deceleration current ($I_b$), and acceleration time ($T_a$), in FIG. 9, the relationship between integration values of the acceleration profile and the desired deceleration profile is expressed by the following Equations:

Integration value $A$ of acceleration profile=$I_a \times T_a$ (Equation 1)

Integration value $B$ of desired deceleration profile=$I_b \times T_{b1}+(I_b \times T_{b2})/2$ (Equation 2)

$T_{b1}$ is a first deceleration time period when deceleration current having a maximum magnitude ($I_b$) are applied on the VCM of the actuator 6 (as illustrated in FIG. 9). $T_{b2}$ is a second deceleration time period when the magnitude of the deceleration current applied on the VCM of the actuator 6 is ramped down from ($I_b$) to substantially 0 (as illustrated in FIG. 9).

If the integration values A and B are set to be equal, a moving speed of the actuator 6 and thus the head 4 is substantially 0 at the end of the second deceleration time period $T_{b2}$.

When $I_a=I_b$, the following Equation is satisfied:

$T_{b2}=A \times T_{b1}, A=2(T_a/T_{b1}-1)$ (Equation 3)

In this case, acceleration $a(t)=K_a \times I_a$, wherein $K_a$ is an acceleration constant.

Since the acceleration time $T_a$ is maintained constant, an unlatching speed is calculated by the following Equation:

$v(t)=K_a \times I_a \times T_a$ (Equation 4)

Note that the direction of the deceleration current applied according to the deceleration profile during $T_{b1}$ and $T_{b2}$ is opposite to that of the acceleration current applied according to the acceleration profile during $T_a$.

In this manner, the desired deceleration profile of FIG. 9 can be determined using Equations (1) and (2). With such a desired deceleration profile of FIG. 9, the head moving speed is substantially 0 by the end of $T_{b2}$ such that the head 4 is gracefully parked with minimized damage to the head 4. In addition, with the desired deceleration profile of FIG. 9, minimum deceleration current is applied to the VCM of the actuator 6 for achieving a graceful parking of the head 4.

Figure 10:
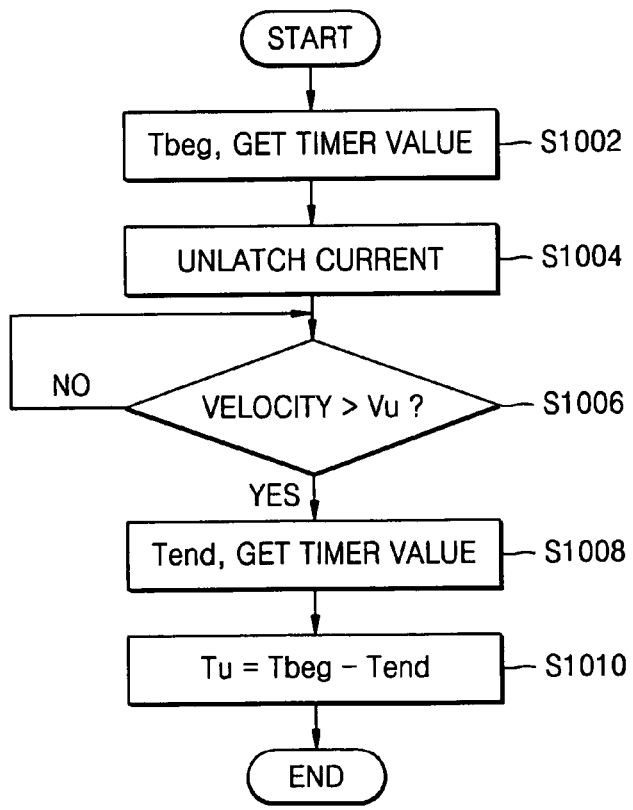
FIG. 10 is a flowchart illustrating a method of measuring a time $T_u$ required to separate a head from a latch system starting from application of acceleration currents to the VCM, according to an embodiment of the present invention.

FIG. 10 is a flowchart illustrating a method of measuring a time $T_u$ required to separate an actuator 6 from a latch system starting from application of the acceleration current to the VCM, according to an embodiment of the present invention. Whether the actuator 6 is separated from the latch system is determined by checking whether the actuator 6 is moving or not.

For example, whether the actuator 6 is moving or not can be determined by electromotive power $B_{emf}$ of the VCM which is used in the lamp loading type latch system. That is, when the electromotive power $B_{emf}$ is greater than a predetermined value, the actuator 6 is determined to be moving. However, an additional peripheral circuit is required for such a determination. Therefore, the present invention uses servo information read by the head 4 for determining when the actuator 6 starts to move. Such determination is made during a process test.

In the method of FIG. 10, a starting timer value $T_{beg}$ is stored (step 1002) at start of application of an unlatching (i.e., acceleration) current $I_a$ to the VCM (step 1004). Next, a speed value $(cyl_n-cyl_{(n-1)})$ is calculated using a gray code read from the head at intervals of several μs, and whether the speed value $(cyl_n-cyl_{(n-1)})$ is greater than a minimum VCM moving speed $V_u$ is determined (step 1006). $cyl_n$ denotes a currently sampled cylinder number and $cyl_{(n-1)}$ denotes a previously sampled cylinder number.

If the head moving speed is greater than the minimum speed $V_u$, an ending timer value $T_{end}$ is stored (step 1008), and the time value $T_u$ is calculated by the following equation (step 1010):

$T_u=T_{beg}-T_{end}$ (Equation 5)

Thus, referring to FIG. 9, $T_{total}=T_u+T_a$ is measurable from application of the acceleration current. After determining $T_u$ according to the flowchart of FIG. 10, $T_a$ is determined as $T_a=T_{total}-T_u$. In addition, $T_{b1}$ is measurable from application of the deceleration current. Thus, Equation 3 may be used with such known values for determining $T_{b2}$ such that the moving speed of the head 4 is substantially zero at the end of $T_{b2}$.

Figure 11:
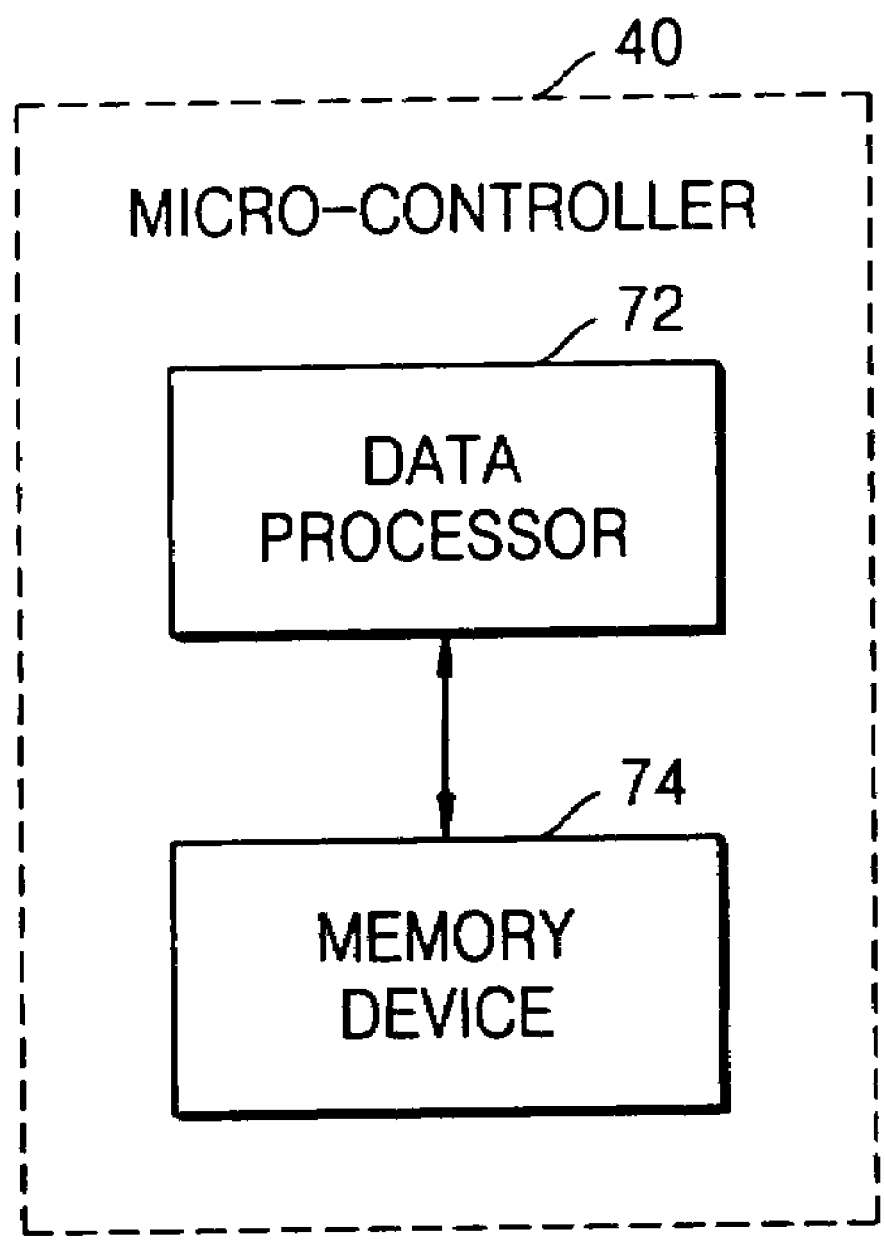
FIG. 11 shows a block diagram of a micro-controller within the disk drive of FIG. 5, according to an embodiment of the present invention.

FIG. 11 illustrates the micro-controller 40 of FIG. 5 being comprised of a data processor 72 and a memory device 74, in an example embodiment of the present invention. The data processor 72 may determine $T_{b2}$ from the values of $T_{b1}$ and $T_a$ according to equation 3 when $I_a=I_b$, for the acceleration profile and the desired deceleration profile of FIG. 9. The data processor 72 then stores such a desired deceleration profile in the memory device 74. The memory device 74 also has sequences of instructions stored therein to be executed by the data processor 72. Execution of such sequences of instructions by the data processor 72 causes the data processor to perform at least some of the steps of FIG. 8 such as steps 802, 804, 806, 808, 810, 812, 814, and 818 for example.

The foregoing is by way of example only and is not intended to be limiting. For example, any numbers described or illustrated herein, such as the number of heads 4 and discs 2, are by way of example only. The present invention may be applied for accelerating and decelerating any number of heads within a disc drive. In addition, the individual components illustrated and described herein for embodiments of the present invention are by way of example only. For example, the present invention may be practiced for any types of disc drives aside from the example of a HDD (hard disc drive).

While this invention has been particularly shown and described with reference to example embodiments thereof, it will be understood by those skilled in the art that various changes in form and details may be made therein without departing from the spirit and scope of the invention as defined by the appended claims.

What is claimed is:

1. A method of decelerating a head after being accelerated in a disc drive, comprising:
   determining a desired deceleration profile from an acceleration profile; and
   applying a deceleration current to a voice coil motor (VCM) according to the desired deceleration profile to decelerate the head;
   wherein the head is accelerated according to the acceleration profile for being unlatched from being parked before being decelerated according to the desired deceleration profile that is determined from having an integration value of the desired deceleration profile substantially equal to an integration value of the acceleration profile such that the head becomes parked immediately after being unlatched.

2. The method of claim 1, further comprising:
   determining that servo information is not available after the head is accelerated and before applying the deceleration current to the VCM.

3. The method of claim 2, further comprising:
   setting a flag indicating that the head is being decelerated to be re-latched.

4. The method of claim 1, wherein the desired deceleration profile is a graph of a magnitude of the deceleration current versus time, and wherein the acceleration profile is a graph of a magnitude of acceleration current applied on the VCM versus time.

5. The method of claim 4, wherein the head is accelerated according to the acceleration profile before being decelerated according to the desired deceleration profile during an unlatching process for the head.

6. The method of claim 4, wherein the deceleration current is applied on the VCM in an opposite direction from that of the acceleration current.

7. The method of claim 4, further comprising:
   parking the head with substantially zero speed by an end of the desired deceleration profile.

8. The method of claim 4, wherein the acceleration profile includes a maximum acceleration current level ($I_a$) being applied to the VCM for an acceleration time period ($T_a$).

9. The method of claim 8, wherein $T_a=T_{total}-T_u$, with $T_{total}$ being a total time of applying the acceleration current to the VCM to accelerate the head that is initially latched with a latch system, and with $T_u$ being an unlatching time for unlatching the head from the latch system.

10. The method of claim 9, wherein the latch system is of a magnetic type.

11. The method of claim 8, wherein the desired deceleration profile includes a maximum deceleration current level ($I_b$) being applied to the VCM for a first deceleration time period ($T_{b1}$), and includes a ramping down of the deceleration current from ($I_b$) to zero during a second deceleration time period ($T_{b2}$).

12. The method of claim 11, wherein $T_{b2}=2*[T_a-T_{b1}]$ when $I_a=I_b$.

13. The method of claim 11, further comprising:
   parking the head with substantially zero speed at an end of the second deceleration time period ($T_{b2}$).

14. The method of claim 1, wherein the disc drive is a HDD (hard disc drive).

15. A disc drive comprising:
   a head;
   a voice coil motor (VCM) having current applied thereon for accelerating and decelerating the head; and
   a micro-controller including:
   a data processor; and
   a memory device having a desired deceleration profile stored thereon, and having sequences of instructions stored thereon, wherein execution of the sequences of instructions by the data processor causes the data processor to perform the function of:
   applying a deceleration current to the VCM according to the desired deceleration profile to decelerate the head after being accelerated;
   wherein the desired deceleration profile is determined from an acceleration profile, with the head being accelerated according to the acceleration profile for being unlatched from being parked before being decelerated according to the desired deceleration profile that is determined from having an integration value of the desired deceleration profile substantially equal to an integration value of the acceleration profile such that the head becomes parked immediately after being unlatched.

16. The disc drive of claim 15, wherein execution of the sequences of instructions causes the data processor to further perform the function of:
   determining that servo information is not available after the head is accelerated and before applying the deceleration current to the VCM.

17. The disc drive of claim 16, wherein execution of the sequences of instructions causes the data processor to further perform the function of:

setting a flag indicating that the head is being decelerated to be re-latched.

18. The disc drive of claim 16, further comprising:
a latch system to which the head is latched before being accelerated, and to which the head is re-latched after being decelerated.

19. The disc drive of claim 18, wherein the latch system is of a magnetic type.

20. The disc drive of claim 15, wherein the head is accelerated according to the acceleration profile before being decelerated according to the desired deceleration profile during an unlatching process for the head.

21. The disc drive of claim 15, wherein the desired deceleration profile is a graph of a magnitude of the deceleration current versus time, and wherein the acceleration profile is a graph of a magnitude of acceleration current applied on the VCM versus time.

22. The disc drive of claim 15, wherein the head is parked with substantially zero speed by an end of the desired deceleration profile.

23. The disc drive of claim 15, wherein the disc drive is a HDD (hard disc drive).

* * * * *